Nov. 15, 1949     W. C. DE ROO     2,488,006
DAMPER PIVOT
Filed June 10, 1946
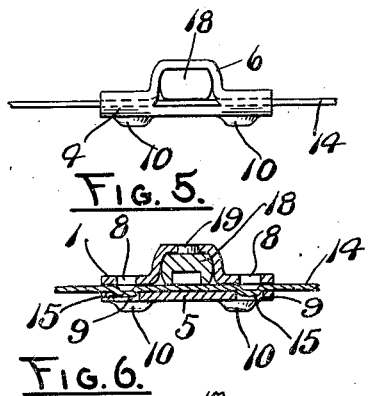
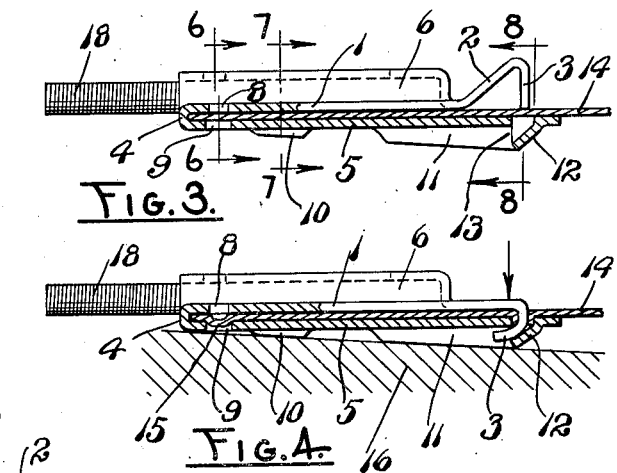
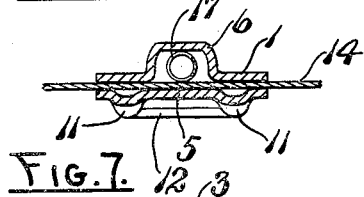
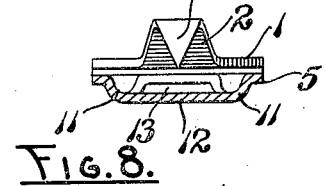
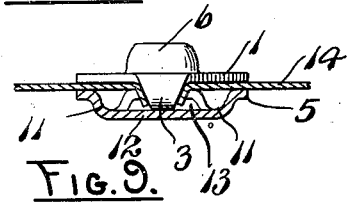
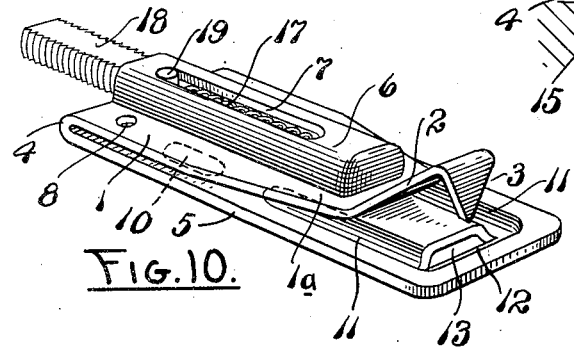
INVENTOR
WILLIAM C. DE ROO
BY Liverance and
Van Antwerp
ATTORNEYS Patented Nov. 15, 1949

2,488,006

UNITED STATES PATENT OFFICE 2,488,006

DAMPER PIVOT

William C. De Roo, Holland, Mich., assignor to Hart & Cooley Manufacturing Company, Holland, Mich., a corporation of Delaware Application June 10, 1946, Serial No. 675,762

3 Claims. (Cl. 126—285)

1

This invention is concerned with dampers used in furnace pipes, and is more particularly directed to a damper pivot construction readily attached at one side of the damper plate, which may be retracted so that the damper is easily inserted in a pipe to a position between two oppositely located openings there to which the damper pivots extend. It is a primary object and purpose of the present invention to provide a simple, very economically produced and effective damper pivot construction which is of ample strength and rigidity, and which may be very expeditiously attached to a side of a plate of sheet metal of the proper size and outline to go within a furnace pipe and form a damper therefor.

An understanding of the invention may be had from the following description taken in connection with the accompanying drawing, in which Fig. 1 is an elevation of the damper pivot construction at one side thereof connected to the damper, a fragmentary portion of which is shown.

Fig. 2 is an elevation from the opposite side thereof.

Fig. 3 is a fragmentary partial edge elevation and longitudinal vertical section showing the pivot construction about to be attached to the damper plate.

Fig. 4 is a view similar to Fig. 3 after the attachment to the damper plate has been completed.

Fig. 5 is an end elevation of the structure shown in Fig. 1.

Figs. 6, 7 and 8 are transverse sections substantially on the planes of lines 6—6, 7—7 and 8—8 of Fig. 3 looking in the directions indicated.

Fig. 9 is a transverse section similar to Fig. 8 substantially at the same plane in Fig. 4, and Fig. 10 is a perspective view of the damper pivot construction prior to its connection to a damper plate.

Like reference characters refer to like parts in the different figures of the drawings.

In the construction disclosed, a length of flat metal is shaped to have a side 1 which, toward its free end, is narrowed in width as indicated at 1a, and is bent outwardly at an angle to make a section 2 and terminates in a pointed tang 3 located generally at an acute angle to the section 2. At the opposite end of the side, the metal is bent back upon itself in a return bend 4 and continued making a second side 5 of rectangular shape the length of which is greater than the side 1 so that at its free end it extends a short distance beyond the pointed tang 3.

The side 1, from the bend at 4 and nearly to the section 2, is drawn and pressed outwardly to

2 make an elongated housing 6 which is closed at the end adjacent the section 2 and open at its other end adjacent the bend 4. In the outer side of the housing 6 an elongated slot 7 is cut. Also, at each side of said housing 6 and a short distance from the return bend at 4 an opening 8 is pierced through said side 1, as shown.

The opposite side 5 has two openings 9 therethrough directly opposite the openings 8 and slightly larger in diameter. Said side 5, a short distance from the openings 9, has two outwardly pressed nubs 10 and at its free end portion, an outwardly pressed U-shaped rib having parallel sides 11 connected by a cross connecting end 12, a part of the inner side of which is removed between the sides 11 making an opening 13 (Fig. 3).

A damper plate 14 of thin metal is insertable between the opposite sides 1 and 5, as shown in Fig. 3. When located with an edge against the return bend at 4. The tang 3 is driven through the damper plate 14, as in Fig. 4, the structure being located against any suitable surface 16. The pointed tang at 3 will follow the inner surface of the rib at 12 and be directed through the opening 13 and clinched against the side 5, which in such position, is an under side to the damper pivot construction. The metal of the damper plate 14 between the openings 8 and 9, is upset and pressed into said openings 9 by the use of a suitable punch or punches, passing through the openings 8 for driving the metal, as at 15, partly through said openings 9 (Fig. 4).

Within the housing 6 a coiled spring 17 of light strength is located. A threaded bar or stem 18 is inserted at the open end of the housing against the outer end of the spring. A boss 19 extends through the slot 7 and is an integral part of or permanently connected with the threaded bar 18. With the construction as described, the bar 18 may be pushed into the housing 6 when an assembly with a furnace pipe is to be made in an old and well known manner, the spring projecting the bar outwardly when an opening in a side of the pipe is reached for the passage of the bar 18.

The damper pivot consisting of three parts has its major element of structure made from a single length of flat metal which is readily shaped and formed, in rapid quantity production, by punch press operations. The spring 17 and the threaded bar or stem 18 are quickly and easily produced and the assembly of the parts is simple and easy. The attachment of the damper pivot construction to a damper plate in the field is done substantially instantly, requiring little or no skill for bending and clinching the tang at 3 or for punching the metal of the damper plate into the openings at 9. The structure is economically produced, sturdy and durable in service and very quickly connected with the metal damper plate.

The invention is defined in the appended claims and is to be considered comprehensive of all forms of structure coming within their scope.

I claim:

1. A damper pivot structure comprising a body formed of a single piece of metal folded to form two closely spaced parallel upper and lower sides joined by said fold at their forward ends and adapted to have a thin damper plate inserted between them, the upper of said sides having an upwardly embossed housing open at its forward end adjacent said fold and closed at its opposite end, a portion of said upper side adjacent said housing being bent upwardly and provided at its upturned portion with a downturned sharp prong, said lower side having an opening opposite said prong adapted to have the prong inserted therethrough and a downwardly inclined anvil flange extending beneath said opening adapted to crimp the prong against the lower face of the lower side to secure the sides together, and a pivot pin mounted in said housing and extending outwardly through the open end thereof.

2. The elements of claim 1, said lower side having downwardly embossed ribs extending downwardly at least as far as the downward extension of said anvil flange.

3. The elements of claim 1, each of said sides having alined openings therethrough near said fold.

WILLIAM C. DE ROO.

REFERENCES CITED

The following references are of record in the file of this patent:

UNITED STATES PATENTS

| Number | Name | Date |
|---|---|---|
| 342,301 | Hyde | May 18, 1886 |
| 1,398,038 | Olinger | Nov. 22, 1921 |
| 2,146,142 | Heasley | Feb. 7, 1939 |
| 2,186,789 | Rosenberg | Jan. 9, 1940 |
| 2,323,038 | Heasley | June 29, 1943 |
| 2,362,623 | Fossum | Nov. 14, 1944 |